United States Patent [19]

Seestrom

[11] Patent Number: 4,652,317

[45] Date of Patent: Mar. 24, 1987

[54] HAND HELD LABELER HAVING AN OPTICAL READER

[75] Inventor: Frank E. Seestrom, Weston, Conn.

[73] Assignee: Pitney Bowes Inc., Stamford, Conn.

[21] Appl. No.: 848,071

[22] Filed: Apr. 4, 1986

[51] Int. Cl.$^4$ .............................................. B65C 9/46
[52] U.S. Cl. ...................................... 156/64; 101/288;
    156/277; 156/361; 156/384; 156/577; 156/579;
    156/DIG. 33; 156/DIG. 44; 156/DIG. 49;
    221/9; 221/73
[58] Field of Search .................. 101/288; 156/64, 277,
    156/361, 384, 387, 577, 579, DIG. 33, DIG. 44,
    DIG. 49; 221/9, 73

[56] References Cited

U.S. PATENT DOCUMENTS

| 3,504,622 | 4/1970 | Morrison | 101/99 |
| 4,264,396 | 4/1981 | Stewart | 156/361 |
| 4,516,016 | 5/1985 | Kodron | 235/472 |
| 4,552,608 | 11/1985 | Hoffmann et al. | 156/361 X |
| 4,578,138 | 3/1986 | Hamisch et al. | 156/361 |
| 4,584,047 | 4/1986 | Vanderpool et al. | 156/361 |

Primary Examiner—Robert A. Dawson
Attorney, Agent, or Firm—Peter Vrahotes; Melvin J. Scolnick; David E. Pitchenik

[57] ABSTRACT

A hand held labeler having an optical reader attached thereto whereby an encoded article may be scanned to provide information to the labeler. The information may be used to set the print head of the labeler.

20 Claims, 2 Drawing Figures

HAND HELD LABELER HAVING AN OPTICAL READER

BACKGROUND OF THE INVENTION

The invention relates to hand held labeling machines of the kind used in supermarkets and other stores to apply self adhesive labels to articles for displaying the price of the article and other information. Subsequent to applying such labels to articles, the latter are placed upon shelves so as to be accessible to consumers. These shelves have affixed thereto self labels that have a bar code thereon that identifies the article to be placed thereon. Most articles also have a bar code printed on them that is used for identification purposes. These bar codes are standardized by the Uniform Code Council for the purpose of identifying each article by a unique bar code.

Such hand held labeling machines, hereinafter referred to as labelers, have a receptacle for a supply of labels to be printed, a print head, control mechanism for selecting data to be printed by the print head, and mechanism actuatable to effect printing of a label by the print head with the selected data and advancement of the printed label to a dispensing position from which it can be dispensed for application to an article. At the same time, another label is advanced to the location of the print head for the next operation.

In such labelers, the labels are fed from a roll mechanically in response to manual actuation of a lever associated with a handle, and the printing operation is effected mechanically by means of inked printing elements.

More recently, electronic labelers having keyboards that electronically reset the print head have become commercially available.

Obviously, it would be advantageous to provide such labelers with alternative means for resetting the print head and take advantage of the bar codes that appear on articles and shelf labels.

This invention, accordingly, has an object the provision of a labeler which is easier to employ than known labelers at least in that it does not require repeated manual input.

It is a further object of the invention to provide a labeler which can be employed with a minimum of physical effort.

It is moreover an object of the invention to provide a labeler with an optical reading device for reading information in the form of bar code or OCR for effecting setting of the print elements of a print head.

It is an additional object of the invention to provide a labeler with an optical reader whereby data may be input to the labeler upon scanning of an encoded object.

It is a still further object of this invention to provide an electronic hand held labeler which may be operated by the use of only one hand.

It is another object of this invention to provide a labeler whose print head may be set quickly.

SUMMARY OF THE INVENTION

The invention accordingly provides a labeler in which the print head is automatically set in response to the reading of coded information on a shelf label, coded information on the article to be labeled or the like, the labeler having an electronic print head setting means for controlling the setting of print head elements. The print head may be set to print a bar code that duplicates the bar code on a shelf label that is scanned by the reader or the price of the article may be printed in alpha-numeric form in response to information stored in memory in the labeler.

According to a further feature of the invention, the print head setting mechanism of a labeler includes an optical reader, such as a light pen, for input of selected data into a microprocessor which in turn provides outputs to the print head selecting mechanism to effect printing of the selected data onto a label.

In this way, the machine is made easier to operate, as the physical input required to set the print head is replaced by an optical reader capable of scanning a code and inputing pulses that will be received by a processor.

According to another feature of the invention, the labeler can be provided with a data register for receiving and storing information relating to the use of the labeler and at least one display means for displaying the stored information and output means for transferring the stored information to an external computer or data storage means, for use in stock control and/or accounting procedures.

In this way information can be input to the labeler without being directly under the user's control, the information being obtained from shelf labels or from the particular articles being labelled. The machine can also be arranged to print each label with a bar code or the like for mechanical reading if desired.

DETAILED DESCRIPTION OF THE PREFERRED EMBODIMENT

Figure 1:
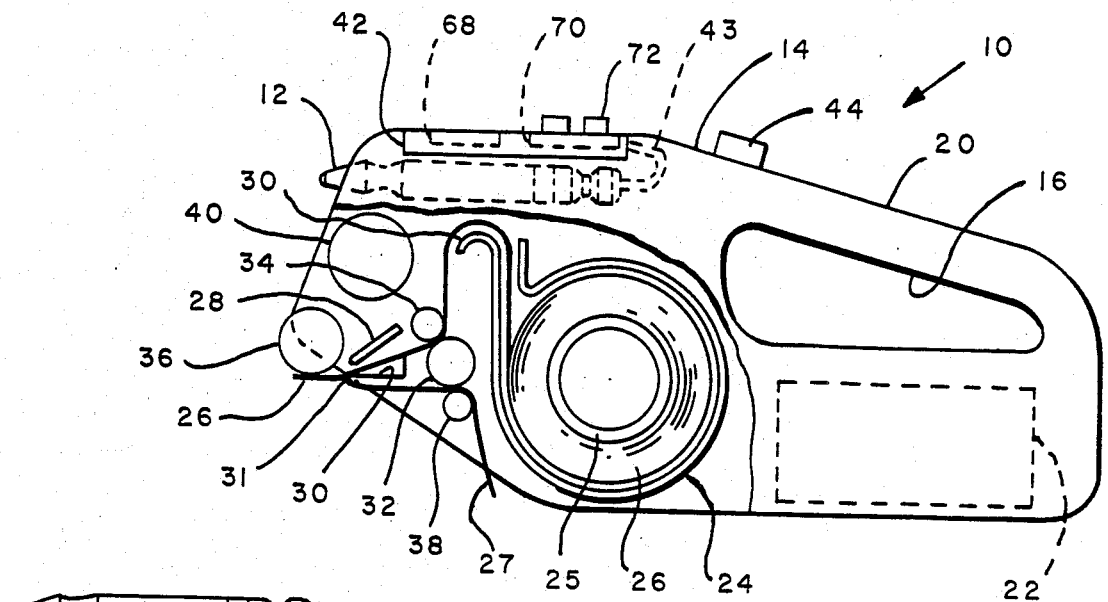
FIG. 1 is a partially schematic, cross-sectional view of a labeler embodying the instant invention.

A hand held labeling machine, hereinafter labeler, is shown generally at 10 and has an optical reader, such as a light pen 12, received within a housing 14 with a portion extending therefrom. The light pen may be any of a number of commercially available devices and reference may be had to U.S. Pat. No. 3,869,599 for the description of a suitable light pen that may be used in the instant invention. The housing 14 is shaped with an opening 16 to provide a handle portion 20 at its upper right hand side as shown in FIG. 1. Immediately beneath the handle portion 20, the housing 14 interior provides space for reception of an electric energy source in the form of one or more batteries 22, with door means (not shown) permitting replacement thereof. The energy source 22 may be a rechargeable power pack in which event terminals are provided for recharging as by connection to a main supply. Centrally of the housing 14, there is located a magazine 24 for holding a roll 25 of labels 26 to be printed and dispensed by the labeler. In the illustrated labeler 10, the labels 26 are provided in the form of thermographic paper or other thermographic material arranged linearly and juxtaposed to one another and supported by a web 27 that is formed about a roll 25. Such a combination of labels 26 and web 27 is referred to in the trade as a label-web composite. The web 27 is led by a feed mechanism generally forwardly from the magazine 24 to a location intermediate a thermographic print head 28 and platen 30 having a knife edge 31. What is meant by thermographic paper is paper that is coated with a material which will change color upon exposure to heat. The thermographic print head 28 has a plurality of seven segment arrays and/or bar code arrays which segments may be selectively heated to react the thermographic paper to print alpha-numerics and/or bar codes thereon.

Door means (not shown) in the housing 14 permits ready replacement of the rolled strip of labels 26 when exhausted and convenient threading of the free end of the label-web composite 26,27 through the feed mechanism.

As appears from FIG. 1, the web 27, with the labels 26 carried thereon, is led upwardly from the periphery of the roll 25 and is turned about a guide 30 through 180° to travel between a drive roller 32 and an idler roller 34. The composite 26, 27 emerges from the nip of these rollers to advance forwardly to a location between the print head 28 and the platen 30.

Although shown as a fixed guide over which the composite 26, 27 slides, the platen 30 alternatively may be a support roller. In either event, the platen 30 is shaped to bring the composite 26, 27 in printing engagement with heatable elements of the thermographic print head 28.

After being printed at the print head 28, a label 26 is peeled from the web 27 and continues forwardly out of an opening in the housing 14 to beneath a dispensing roller 36, by which it can be wiped onto an article to be labelled. The label 26 is preferably self-adhesive, that is, it carries an adhesive layer on the surface opposite that which is printed, and this adhesive layer is initially in contact with the web 27 from which must be separated before the label this can be applied to an article. For this purpose, the platen 30 is provided with a relatively sharp knife edge 31 around which the web 27 is turned rearwardly back into the machine to be received between the drive roller 32 and a second idler roller 38 while the label is peeled therefrom and urged through an opening within the housing 14 to be received by the dispensing roller 36. The web 27 will be fed from the rollers 32, 38 rearwardly and downwardly out of the labeler through an aperture in the housing 14.

The drive roller 32 is driven by an electric motor 40, which can be a stepper motor, accommodated at the front of the housing 14 above the dispensing roller 36 and below the light pen 12. The labeler 10 operates under control of electronic circuitry 42, shown schematically in FIG. 2, which is located at the top of the housing 14 and is connected to the light pen 12 through a cable 43 through which information can be entered into the circuitry. The labeler 10 is actuated by means of a push button operated main control switch 44 positioned rearwardly of the circuit 42 so that it can be pressed by the thumb of an operator holding the machine with his fingers around the handle portion 16.

Figure 2:
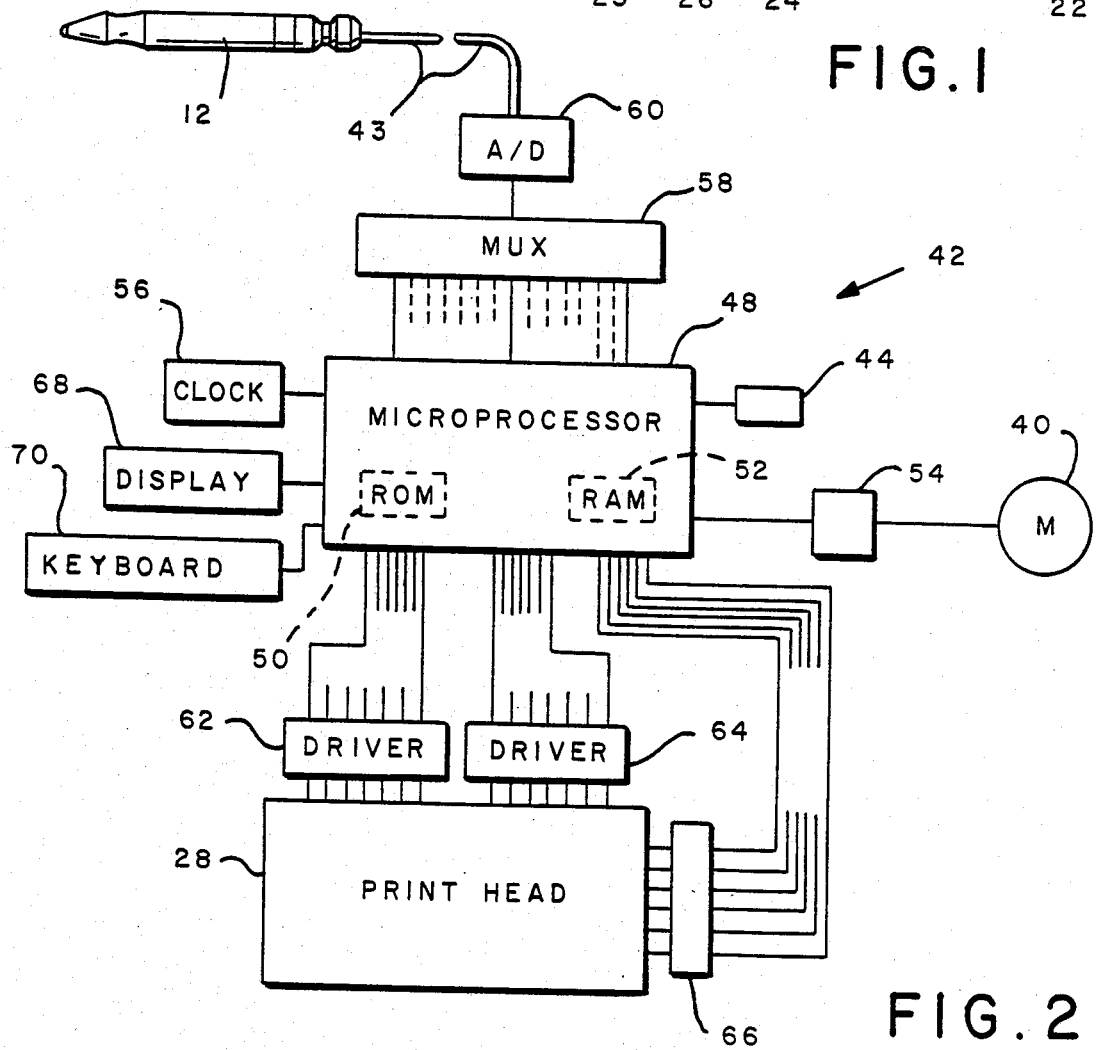
FIG. 2 shows the circuit diagram of the labeler shown in FIG. 1 in block diagram form.

As stated, the illustrated labeler 10 operates under the control of the electronic circuit 42 arrangement shown in schematic block diagram form in FIG. 2. Central to the circuit is a microprocessor 48 which is preferably a single silicon chip which includes within its monolithic structure a read only memory (ROM) 50, a random access memory (RAM) 52, instruction registers, address registers, a central control logic section, and data input and output terminals. When the push-button switch 44 is closed the microprocessor 48 provides outputs to a stepper motor drive control unit 54, which effects operation of the stepper motor 40, and outputs to the print head 28. The circuit 42 includes a clock 56 arranged to provide a pulse train for co-ordinating the operations carried out within the microprocessor 48, a multiplexer 58 that transmits signals in parallel from the light pen 12 to the microprocessor 48. Connected intermediate the multiplexer 58 and the light pen 12 is an analog to digital converter (A/D) 60.

The print head 28 is a solid state thermographic print head, but a hot needle or a thick or thin film thermographic print head could be employed. The print head 28 comprises a plate mounting a matrix or array of printing elements, together with connections to live driver circuit elements 62, 64 and dot driver elements 66, connected to receive signals from the microprocessor 48. The microprocessor 48 is arranged to supply to the driver elements 62, 64 and 66 signals such that certain heating elements of the print head 28, selected in dependence on a program stored within the ROM 50 and responsive to pulses generated by operation of the light pen 12, receive currents sufficient to heat these elements to a temperature at which color is developed or changed on a label 26 over the small area in printing contact with the heating elements. Typically, the print head 28 may carry twelve groups each comprising seven segments, each segment having five heating elements, so that a line of twelve alpha-numeric characters can be printed simultaneously. After a line has been printed, the stepper motor 40 advances the web 27 by such an amount that the area of the label 26 on which the next line of characters is to be printed is in printing engagement with the print element matrix. It will be appreciated that the print head 28 can comprise any appropriate number of heating elements and that the numbers of connections to the print head shown in FIG. 2 are merely illustrative. The print head 28 can be arranged to print characters composed of a dot matrix in any desired combination and to print any number of characters sequentially or simultaneously in a line or column as desired. In addition to or in alternative to alpha-numeric characters, the print head 28 may be fashioned to print bar codes.

Also connected to the microprocessor 48 is a display 68 and a keyboard 70. The keyboard 70 has keys 72 that provide certain procedures. One of the keys 72 enables the light pen 12 and the circuitry 42 for the purpose of setting the print head 28. Other keys 76 allow access to information contained in the RAM 52 which will be represented upon the display 68. The number of items that have been processed, the price of the items, size of the items and the like may be obtained through the display. In addition, data may be input from other optional keys 72 of the keyboard 70 in those instances where either a shelf label cannot be read or where the information on the shelf label is incorrect.

In operation, the labeler 10 is primarily intended for the labeling of articles in stores and supermarkets. The information to appear on labels dispensed by the labeler 10 comprises, at a minimum, the price of the article in alpha numeric or bar code form. Before printing and applying a batch of labels 26, the user will depress the light pen enabling key 72 and pass the labeler 10 across a code, such as a bar code, in such a manner to allow the light pen 12 to scan the code printed on a label secured to the shelf intended to support the articles to be labeled. This scanning will input to the microprocessor 48 pulses representative of the desired price to be printed on each label 26. The price determination is based upon a program stored within the ROM 50 in response to signals received by scanning of the bar code by the light pen 12. Upon scanning, the light pen 12 generates analog pulses that are converted to digital signals by the A/D Converter 60. These digital signals are received in series by the multiplexer 58 and transmitted in parallel to the microprocessor 48. Each time the operator actuates the appropriate key 72, the light pen 12 is enabled, and upon a code being read the key will be released. A printing and dispensing cycle is performed then upon depression of the push-button switch 44, by which a label 26 is printed with the scanned price.

At the beginning of the cycle, i.e. upon depression of push-button switch 44, the leading edge of a label 26 will be just beyond a narrow transverse portion between the heating elements of the print head 28 and the platen 30. In response to the scanning of a code, the microprocessor 48 supplies to the driver elements 62, 64 and 66 signals for energizing selected heating elements in accordance with the information stored in RAM 52 as determined from a scanning by the light pen 12. It will be appreciated that the self label need be scanned only once to store the price information in RAM 52 and a larger number of labels with the same price thereafter may be printed by repeatedly closing the switch 44. The price information will remain in RAM 52 until the appropriate key 72 is depressed and a subsequent scan occurs. Printing of the desired price information on a label 26 is thus effected. Upon the switch 44 being closed, the microprocessor 48 then supplies a signal to the motor control unit 54 to energize the motor 40 sufficiently to advance the web 27 until such time as the next label 26 is placed in position to be printed. The positions of the print head 28, the platen 30 and the roller 36 along the path of the web 27 are such that the printed label 26 is now beneath and in contact with the roller 36 with the web 27 peeled away over about 95% of the length of the printed label. The cut separating the printed label 26 from the next following label of the strip is at the position of the leading edge of the now printed label before the cycle began. The printed label 26 can be applied to an article and the push-button switch 44 pressed again to start another cycle.

The labeler 10 so far described can readily be adapted to print information additional to the price information generated by operation of the light pen 12. The price information will, of course, normally contain one or more fixed elements, in the form of symbols identifying at least the major unit of the currency in which the price is expressed. Additional information can comprise further variable or selected information present by the label on the shelf and input by means of the light pen 12 or by other means such as the keyboard 70.

The additional information can include, for example, the name of the vendor or a sales slogan. Further additional information can include, for example, unit price data, information as to the nature of the article (i.e., its weight or volume or the number of items packed within it), and calendar information (i.e., the date of packaging, the date by which the article expires).

In addition, the label 26 can be printed with alpha numeric data identifying the article in some suitable code, for stock control purposes. The label may also be printed with a bar code representing data relating to the article for reading electrically or optically, as at a check-out counter. The information can be fed into a automatic cash register and/or into a computer for stock control purposes.

It will be evident that the additional information will normally require to be printed on more than one line, and the illustrated labeler 10 can be readily modified for multiline printing, on labels 26 of sufficient length, by arranging for the microprocessor 48 to advance the web 27 through a series of steps each corresponding to a printed line.

One of the primary advantages of the instant invention is that only one hand is required for printing labels. In prior labelers, the labeler was held in one hand and information input manually through the keyboard. This obviously required the use of two hands. With the ability to set the print head 28 by passing the labeler 10 over a shelf label or article label, only one hand is required. This has particular advantages in working environments where one hand is required for support or the like. It also has obvious advantages for the handicapped. Furthermore, setting of the print head is achieved faster by scanning a code as opposed to inputting through a keyboard manually. Another advantage of the invention is that a keyboard 70 is not required so long as there is a key 72 or other scheme for enabling the light pen 12 and circuitry 42.

What is claimed is:

1. A hand-held labeler, comprising: a housing having a manually engageable handle, the housing having means for holding a composite label supply roll composed of labels releasably adhered to a web, the housing further having means for holding a source of electrical energy, an optical reader received within the housing and having a portion extending therefrom for entering selected data to be printed, means including an electrically selectable print head powered by the source of electrical energy for printing on a label at a printing position, means for peeling a printed label from the web, label applying means disposed adjacent the peeling means, means for advancing the web to peel a printed label from the web at the peeling means and advance the printed label into label applying relationship with the label applying means and to advance another label to the printing position, means coupled to the optical reader for receiving and electrically processing data generated by the optical reader, means electrically coupling the data receiving and processing means and the electrically selectable printing head, and means for causing the data receiving and processing means to operate the printing head to print the selected data on the label.

2. The labeler of claim 1 wherein said optical reader is a light pen.

3. The labeler of claim 1 wherein said print head is a thermographic print head.

4. A hand-held labeler, comprising: a housing, means for rotatably supporting a composite label supply roll, power support means for supporting a source of electrical energy within the housing, a motor in electrically connectable with said electrical source, guide means within said housing for guiding a web through a portion of said housing, a platen having a knife edge located adjacent an opening of the housing, a print head spaced from said plated, drive means connected to said motor for conveying a web from said guide means to a location intermediate said print head and said platen and for conveying a web about said knife edge and toward a second opening in the housing, a microprocessor in electrical connection with said print head and electrical connectable with an electrical energy source supported by said power support and an optical reader in electrical connection with said microprocessor.

5. The labeler of claim 4 wherein said optical reader is a light pen.

6. The labeler of claim 4 wherein said print head is a thermographic print head.

7. In a hand held labeler, the combination comprising: a print head having a plurality of electrically settable print elements, a platen addressing said print head, means for conveying a strip of labels between said print head and said platen, an electrical circuit in electrical connection with said print head and an optical reader in communication with said processor.

8. The labeler of claim 7 wherein said optical reader is a light pen.

9. The labeler of claim 7 wherein said print head includes a plurality of individually actuatable thermographic print elements.

10. The labeler of claim 7 wherein said electrical circuit includes a microprocessor, at least one driver providing electrical connection between said microprocessor and said print head, a clock in electrical connection with said microprocessor and a switch in electrical connection between said microprocessor and said conveying means.

11. The labeler of claim 10 wherein said print head is a thermographic print head.

12. In a method of adjusting the setting of the print head in a hand held scanner of the type having a settable print head, an electrical circuit in electrical connection with the print head and an input port for providing communication between the electrical circuit and an electrical device, the steps comprising:
connecting an optical reader to the input port,
scanning an encoded article with the optical reader,
sending signals representative of the code on the article from the optical reader to the electrical circuit, and
setting the print head in response to the received signals.

13. In a method of adjusting the setting of the thermographic print head in a hand held labeler of the type having a settable print head, a processor in electrical connection with the print head and an input port for providing communication between the processor and an electrical device, the steps comprising:
securing a light pen within the labeler and connecting the light pen to the input port,
scanning a bar code applied to a shelf label with the light pen,
sending signals representative of the bar code on shelf label from the light pen to the microprocessor
setting the print head in response to the received signals,
printing the information represented by the print head setting upon a label, and
applying the label to an article.

14. A hand-held labeler, comprising: a housing having a manually engageable handle, said housing having means for holding a source of electrical energy, an optical reader received within said housing for entering selected data to be printed, means including an electrically selectable print head powered by the source of electrical energy for printing on a label at a printing position, means for supporting a label at said printing position, means coupled to the optical reader for receiving and electrically processing data generated by the optical reader, means electrically coupling the data receiving and processing means and the electrically selectable printing head, and means for causing the data receiving and processing means to operate the printing head to print the selected data on a label.

15. The labeler of claim 14 wherein said optical reader is a light pen.

16. The labeler of claim 14 wherein said print head is a thermographic print head.

17. The labeler of claim 14 wherein said means for receiving and processing data includes a memory.

18. The labeler of claim 17 including a display and a keyboard mounted on said housing and connected to said data receiving and processing means whereby information stored in said memory may be input to said display upon activation of selected keys of said keyboard.

19. A hand-held labeler, comprising: a housing having means for supporting a source of electrical energy, an optical reader received within said housing for entering selected data to be printed, an electrically selectable print head, means for positioning a label at a position spaced relative to said print head, a microprocessor coupled to said optical reader for receiving and electrically processing data generated by the optical reader, means electrically coupling said microprocessor to said printing head, means for enabling said optical reader to transmit signals to said microprocessor, means for causing the microprocessor to adjust the setting on the print head in response to said signals and means to operate the print head to print a label.

20. The labeler of claim 19 wherein said print head is thermographic.

* * * * *